United States Patent [19]

Kaneko et al.

[11] Patent Number: 5,056,005
[45] Date of Patent: Oct. 8, 1991

[54] DATA BUFFER DEVICE USING FIRST-IN FIRST-OUT MEMORY AND DATA BUFFER ARRAY DEVICE

[75] Inventors: Katsuyuki Kaneko; Satoshi Gokita, both of Moriguchi; Koji Zaiki, Neyagawa, all of Japan

[73] Assignee: Matsushita Electric Industrial Co., Ltd., Osaka, Japan

[21] Appl. No.: 337,399

[22] Filed: Apr. 13, 1989

[30] Foreign Application Priority Data

Apr. 18, 1988 [JP] Japan ................................. 63-94827
May 16, 1988 [JP] Japan ................................ 63-118520

[51] Int. Cl.$^5$ .......................... G11C 7/00; G11C 5/02
[52] U.S. Cl. .................................... 364/200; 364/239; 364/239.6; 364/244.3; 365/189.05; 365/189.06; 365/189.08; 365/193; 365/220
[58] Field of Search ............... 365/189.03, 189.04, 365/189.05, 189.06, 78, 221, 220, 189.08, 193; 364/200, 900

[56] References Cited

U.S. PATENT DOCUMENTS

| 4,110,842 | 8/1978 | Sarkissian et al. | 365/233 |
|---|---|---|---|
| 4,374,428 | 2/1983 | Barnes | 364/900 |
| 4,433,394 | 2/1984 | Torii et al. | 365/189.05 |
| 4,486,854 | 12/1984 | Yuni | 364/900 |
| 4,494,190 | 1/1985 | Peters | 364/200 |
| 4,571,671 | 2/1986 | Burns et al. | 364/200 |
| 4,692,859 | 9/1987 | Ott | 364/200 |
| 4,829,475 | 5/1989 | Ward et al. | 365/189.05 |
| 4,833,655 | 5/1989 | Wolf et al. | 365/221 |
| 4,839,866 | 6/1989 | Ward et al. | 365/221 |
| 4,852,065 | 7/1989 | Baddiley | 365/221 |
| 4,864,543 | 9/1989 | Ward et al. | 365/78 |
| 4,891,788 | 1/1990 | Kreifels | 365/221 |

Primary Examiner—Thomas M. Heckler
Assistant Examiner—Matthew C. Fagan
Attorney, Agent, or Firm—Stevens, Davis, Miller & Mosher

[57] ABSTRACT

The buffer device array includes plural buffer devices connected to a bus, wherein the buffer devices hold the respective device addresses and device selection signals in the course of a data transfer operation and subsequently the device addresses and device selection signals held in the devices are used for inspecting devices with respect to whether they can be used for the next data transfer operation, thus enabling the data transfer operation and checking of device status for the next data transfer to be performed in a pipeline fashion and significantly increasing the efficiency of the data transfer operation and of the overall bus utilization.

3 Claims, 5 Drawing Sheets

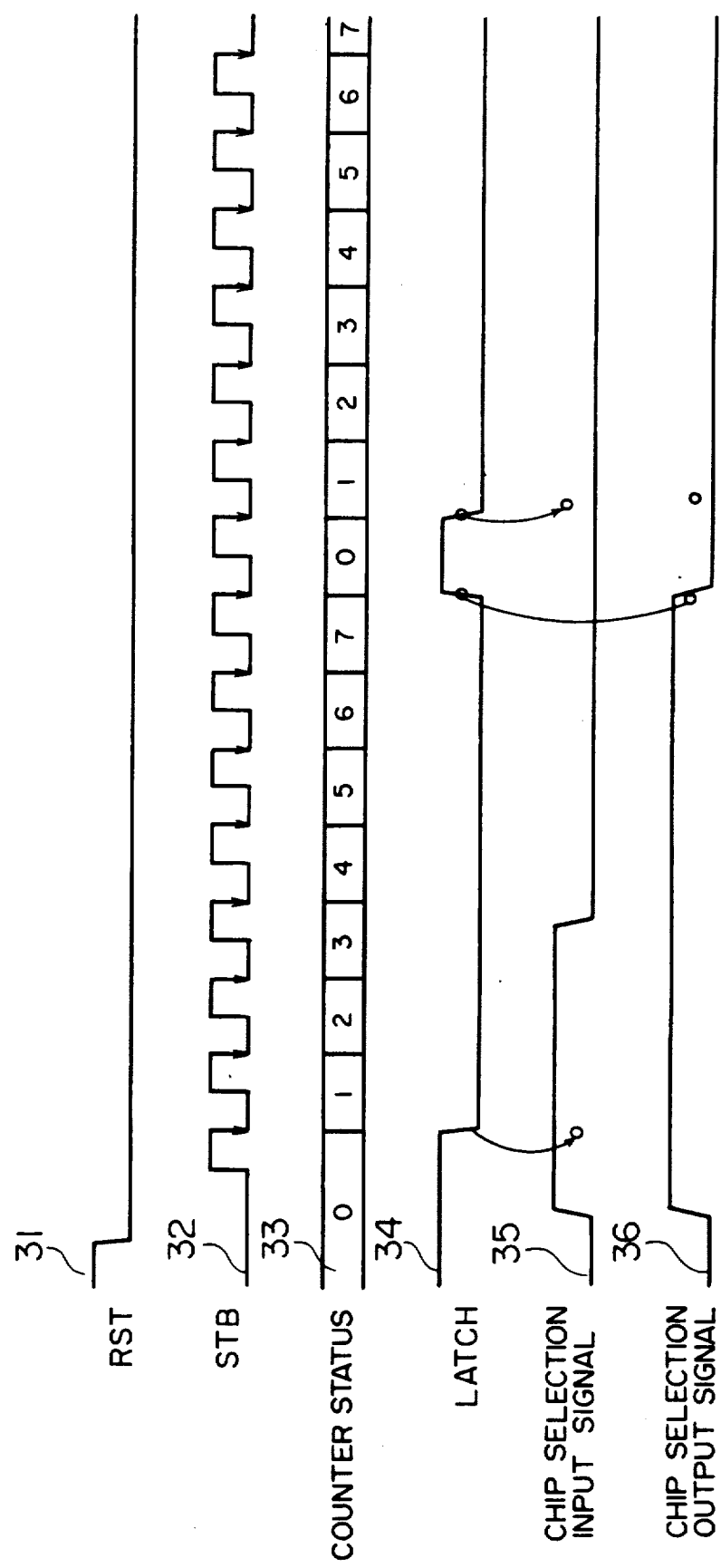

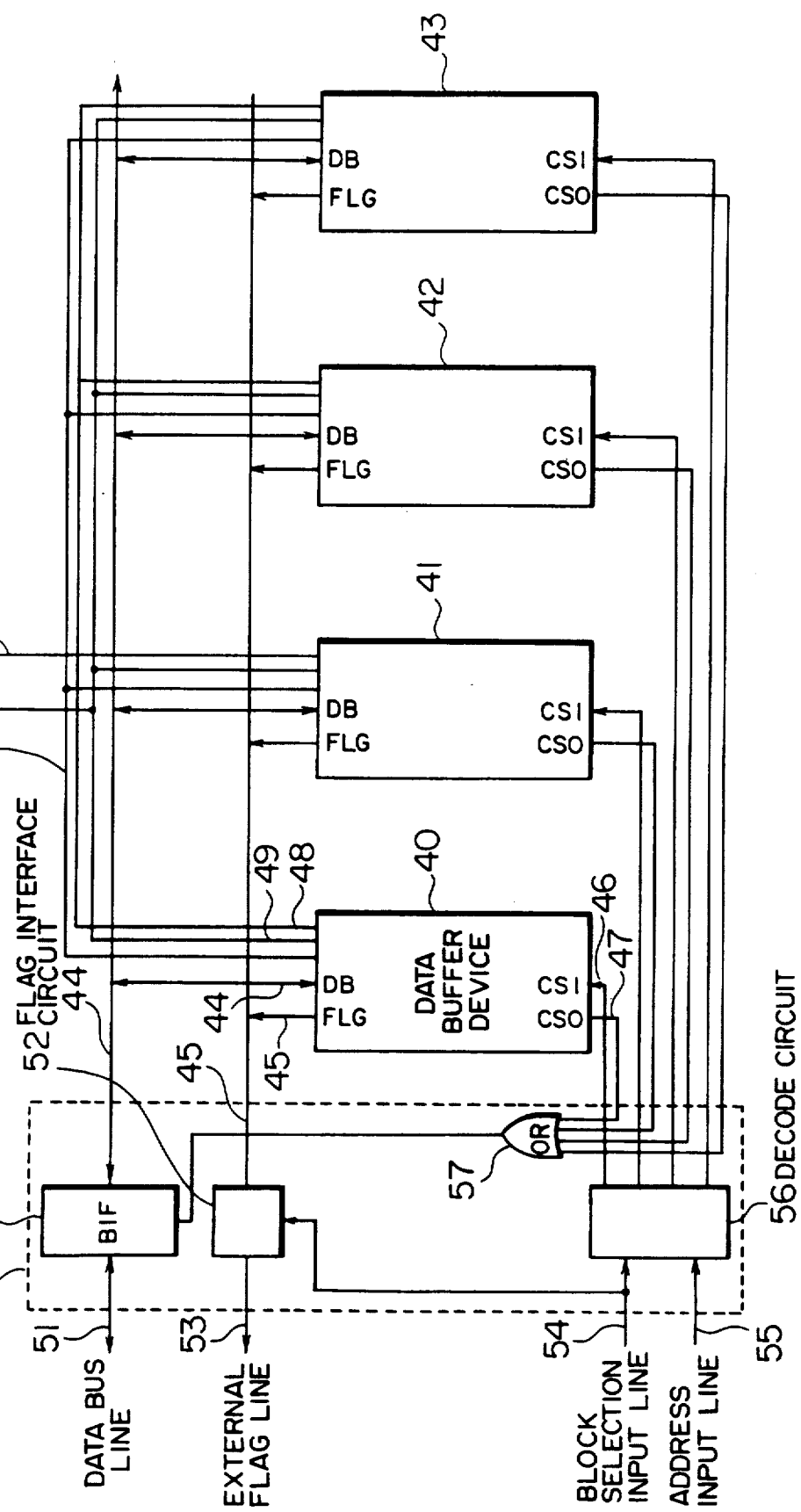

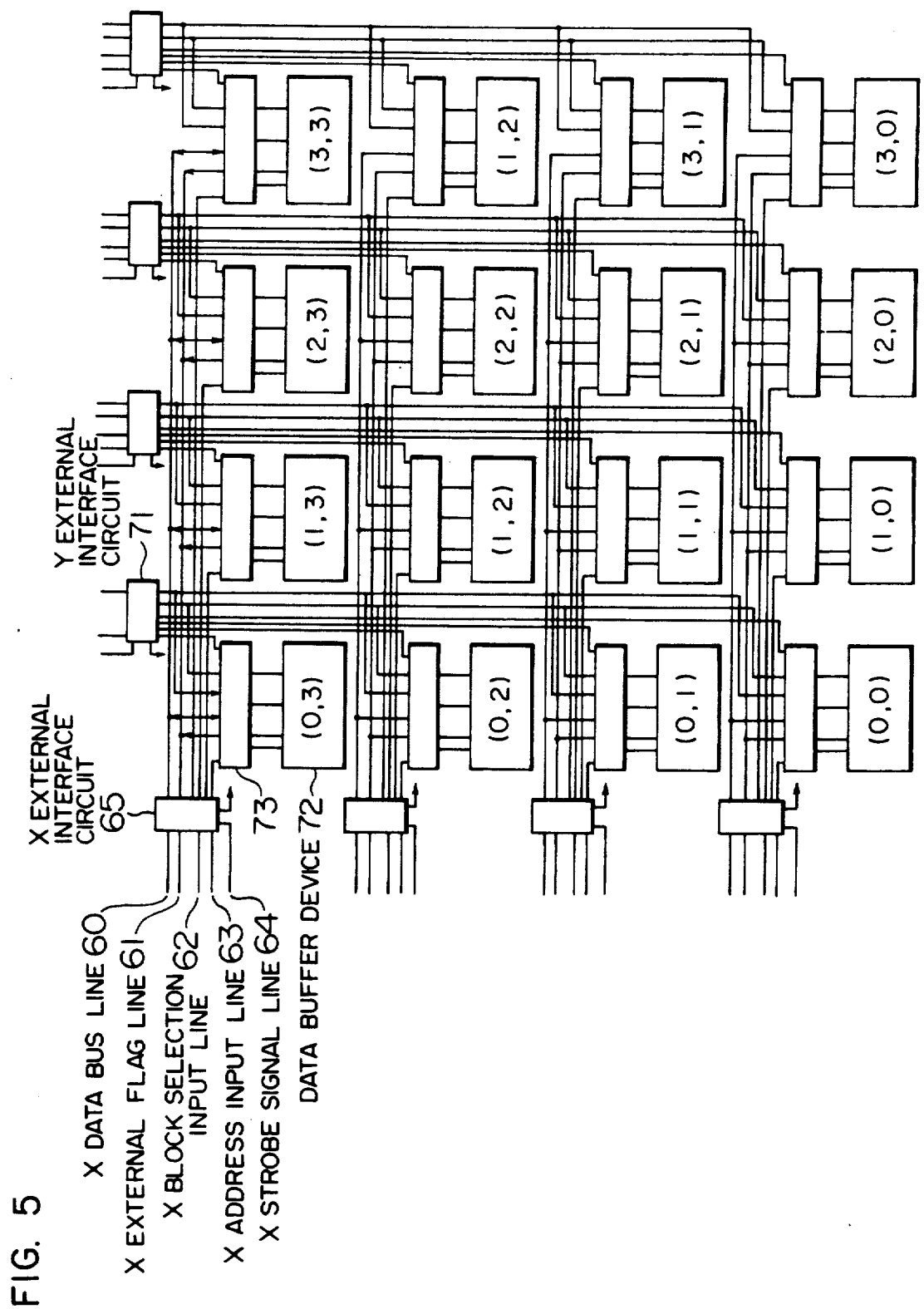

DATA BUFFER DEVICE USING FIRST-IN FIRST-OUT MEMORY AND DATA BUFFER ARRAY DEVICE

BACKGROUND OF THE INVENTION

The present invention relates to a buffer device for data on a bus or a data buffer device, and more particularly to a data buffer device in which data is inputted and outputted with a plurality of words as a minimum unit, and a data buffer array device in which such devices are arrayed one-dimensionally or two-dimensionally.

In the related art, when a device on a bus is to be accessed, a device designation signal (which is usually an address signal or device selection signal) must assure,. predetermined set-up time and hold time relative to a read strobe signal or write strobe signal. Thus, if the device to be accessed is shifted from a device designation A to a device designation B, it is necessary to change the address to B after the access at the address A has been completed, and start the access to B after the signal has been sufficiently stabilized. As a result, when the access is to be shifted between devices, a longer time than a sum of the set-up time and the hold time is spent, and continuous transfer of data cannot be attained and usage efficiency of the bus is low.

Where the access to the device B is permitted depending on a status of the device B, it is necessary to check the status of the device B prior to the access to the device B. This further lowers the usage efficiency of the bus. In order to solve the above problem, it has been proposed to improve the usage efficiency of the bus by pipelining the protocol of the bus. Namely, the bus may be used without waste by preassigning a time in which the bus may be used for the data transfer by staggering the times for three stages, that is, send-out of the device designation signal, acknowledgement of availability of the designated device and transfer of data.

However, in this method, each device must have a relatively complex bus control unit and a waste time corresponding to several pipeline stages takes place if the designated device is not available.

In the prior art method, when the access is to be shifted from one device to another device, a certain time interval must always be spent. This lowers the usage efficiency of the bus. While the pipeline method has been known as a means for preventing the reduction of the usage efficiency of the bus, the bus control therefor is complex and the usage efficiency of the bus is significantly lowered when the pipeline is frequently disturbed.

SUMMARY OF THE INVENTION

It is an object of the present invention to improve the usage efficiency of the bus by a simple configuration.

In order to achieve the above object, a data buffer device has a FIFO memory which outputs a post input/output flag prior to the completion of input/output of N words, where N (N>2) is a minimum transfer unit of words on the bus. Before the completion of the input/output of N words, a chip selection input signal to the data buffer device is latched and it is held until the completion of the input/output. The input/output of the FIFO memory is controlled by the latched chip selection input signal, and the output of the flag of the FIFO memory is controlled by an unlatched chip selection input signal. Thus, after the chip selection input signal has been latched, the transfer data can be fully read or written by referring to the latched chip selection input signal, and the flag of the FIFO memory, that is, the acceptance of the next transfer may be checked by using the chip selection input signal as the next transfer destination.

BRIEF DESCRIPTION OF THE DRAWINGS

FIG. 3 shows waveforms for explaining an operation of the control circuit shown in FIG. 2, FIG. 4 shows a configuration of a data buffer array device in which data buffer devices shown in FIG. 1 are arrayed one-dimensionally, and FIG. 5 shows a configuration of a data buffer array device in which data buffer devices shown in FIG. 1 are arrayed two-dimensionally.

DESCRIPTION OF THE PREFERRED EMBODIMENTS

Figure 1:
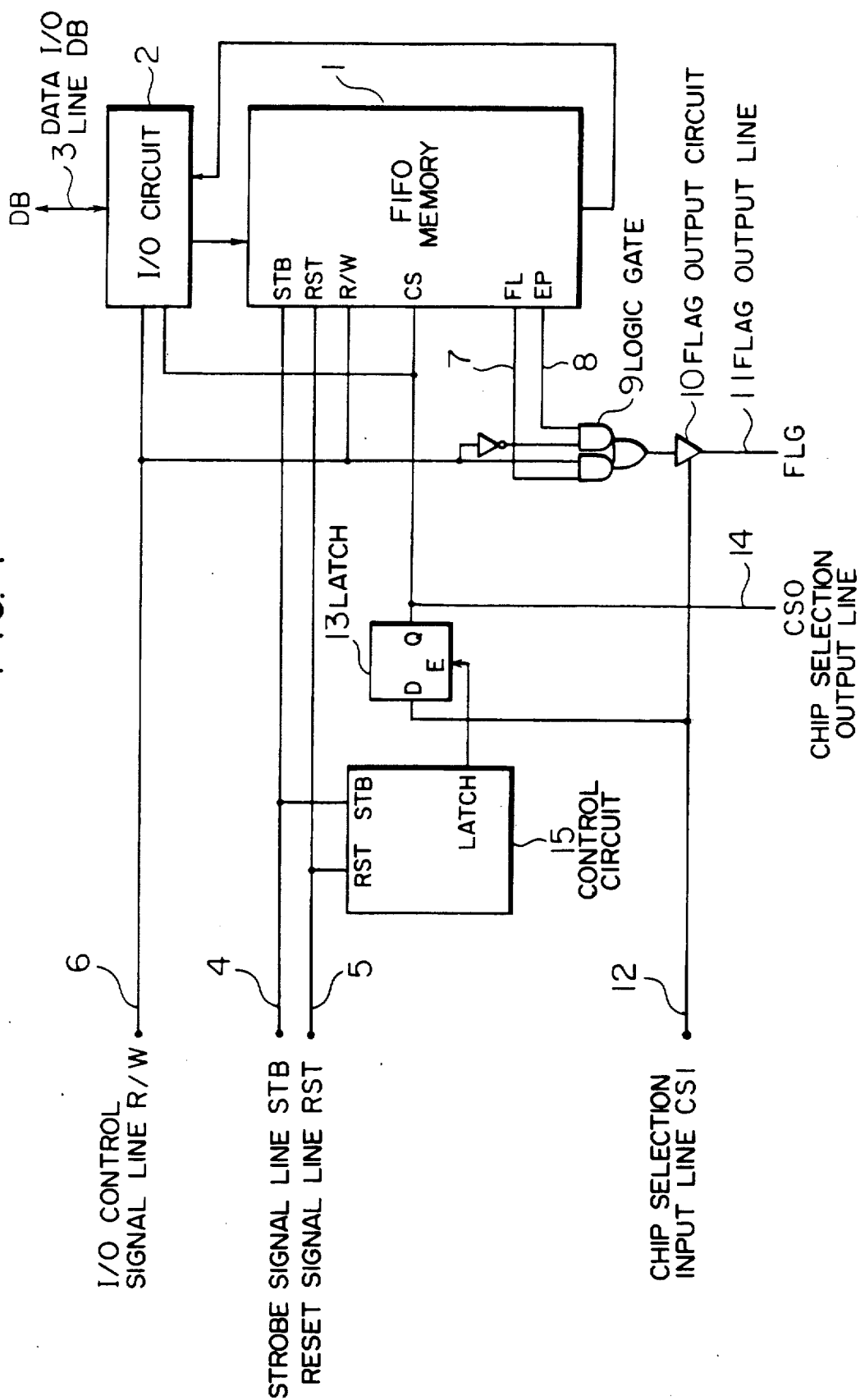
FIG. 1 shows a block diagram of a data buffer device of the present invention.

FIG. 1 shows a block diagram of one embodiment of the data buffer device of the present invention. Numeral 1 denotes a FIFO memory which inputs and outputs 8 words as a unit. The input/output of the FIFO memory is effected via a data input/output line 3 through an input/output circuit 2. The FIFO memory 1 receives a strobe signal line 4, a reset signal line 5 and an input/output control signal line 6. The FIFO memory 1 further has a FL flag output line 7 which indicates a full status and an EP flag output line 8 which indicates an empty status, as status signals of the FIFO memory 1. Those flag signal lines output post input/output flags prior to the completion of the input/output of 8 words. When data is to be written into the FIFO memory 1, a logic gate 9 supplies the FL flag to an output circuit 10, and when the data is to be read, it supplies the EP flag to the output circuit 10. The output circuit 10 is controlled by a chip selection input signal line 12, which is inputted to a latch 13. An output of the latch 13 is connected to a chip selection output line 14. A latch signal to the latch 13 is generated by a control circuit 15. The FIFO memory 1 and the input/output circuit 2 are controlled by the chip selection output line 14.

The control circuit 15 counts the signals on the strobe signal line 4 and generates a signal to the latch 13 so that the latch 13 latches in the course of input/output of a series of 8 words and hold them until the end of the input/output.

Figure 2:
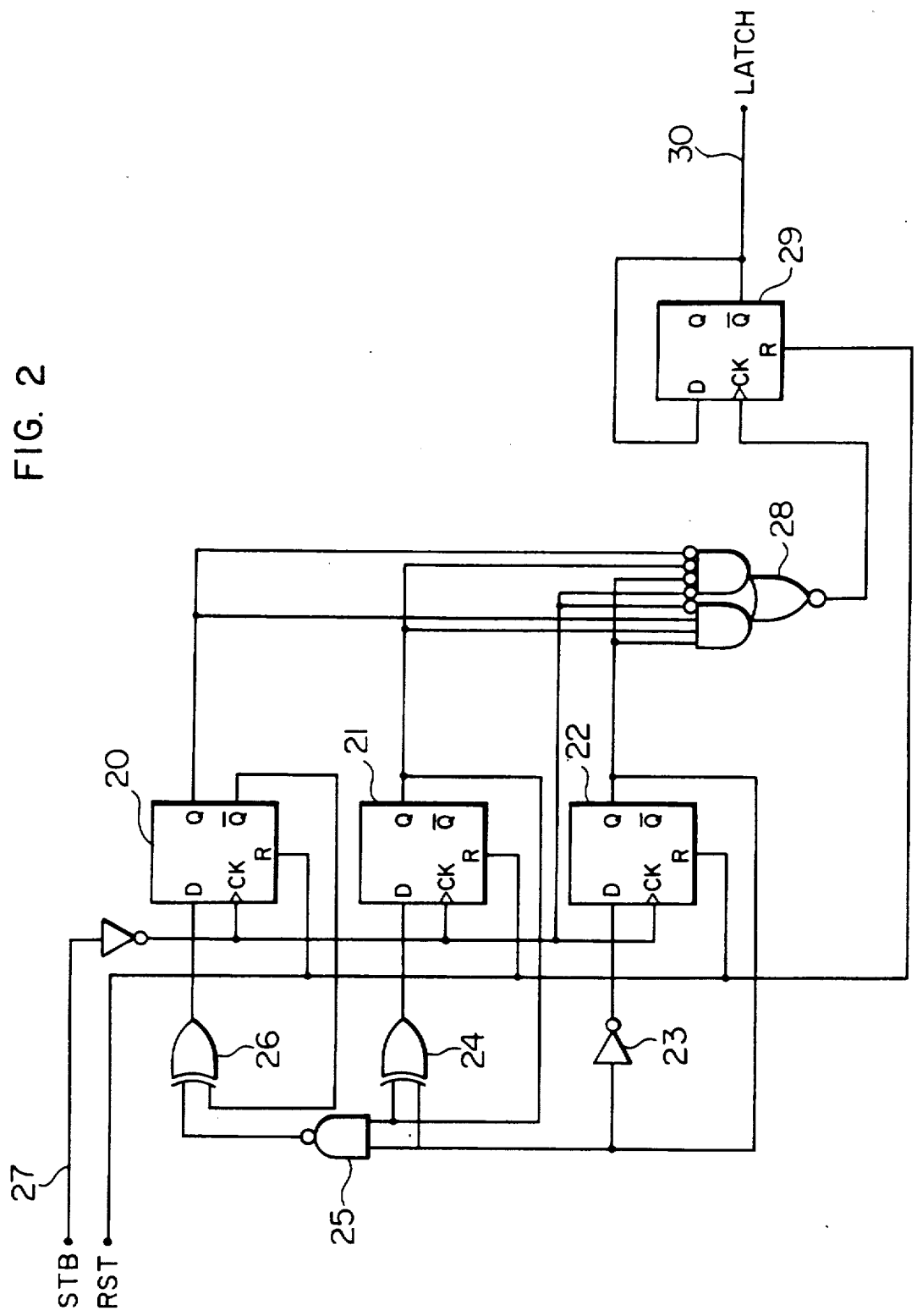
FIG. 2 shows a circuit diagram of a control circuit of the configuration shown in FIG. 1.

FIG. 2 shows a configuration of control circuit 15 where N=8, flip-flops 20–22 and gates 23–26 form a count-of-eight counter which counts falling edges of signals on a strobe signal line 27. The count of the counter is monitored by a gate 28. When the count is "0" or "7", a pulse is sent to a clock input of a flip-flop 29. The flip-flop 29 is constructed to serve as a binary counter. As a result, an output line 30 of the flip-flop 29 produces a signal which falls at a falling edge of the 0-th strobe signal and rises at a falling edge of the seventh strobe signal. When such a signal is applied to the latch 13, the signal on the chip selection input line 12 is held until the end of the eighth word data stored in the latch 13 is in synchronism with the falling edge of the strobe signal corresponding to the first word data (end of the first word data), that is, until the end of one transfer unit. Since the FIFO memory 1 and the input/output circuit 2 are controlled by the output of the latch 13, the subsequent seven words are transferred to the data buffer device which has been selected at the time of transfer of the first word data. On the other hand, since the flag output circuit 10 is controlled directly by the signal on the chip selection input line 12, the output of the flag output circuit 10 is controlled independently from the input/output of the data buffer device after the transfer of the first word data.

In this manner, since the input/output of the data and the output of the flag are controlled by separate signals, the equipment which accesses the data buffer devices may detect, the flag relating to the next transfer of the FIFO memory in the data buffer device whose data is being transferred, by holding the signal on the chip selection input line, and the flag of the FIFO memory in the data buffer device whose data is to be next transferred, by activating the chip selection input line of the data buffer device, while the equipment effects the input/output of the data. FIG. 3 shows waveforms for such an operation. Numerals 31–36 denote a signal on the reset signal line 31, a signal on the strobe signal line 32, a signal applied to the latch 13 from the control circuit 15, a signal on the chip selection input line 12 and a signal on the chip selection output line 14. The counter in the control circuit 15 is initialized by the reset signal 31 so that it counts the subsequent input strobe signals 32. The latch signal 34 reflects the status "0" of the counter. The chip selection input signal 35 is latched by the latch 13 by the signal 34. As a result, the chip selection signal 36 holds the chip selection input signal 35 which is present at the fall of the latch signal 34 until the count of the counter reaches "0" next time, as shown in FIG. 3. By denying the waveform 36, the chip is kept selected even if the chip selection input signal changes after the count of the counter has changed to "1".

FIG. 4 shows a block diagram of an array of data buffer devices in which a plurality of data buffer devices shown in FIG. 1 are arrayed. Numerals 40–43 denote the data buffer devices shown in FIG. 1, and numerals 44–59 denote data input/output line, flag output line, chip selection input line, chip selection output line, reset signal line, strobe signal line, and red/write control signal line which correspond to 3, 11, 12, 14, 5, 4 and 6 in FIG. 1. The data input/output line 44 is connected to an external data bus line 51 through a bus interface circuit 50. The flag output line 45 is connected to an external flag line 53 through a flag interface circuit 52. The data buffer devices 40–43 are blocked in one, and a block selection input line 54 which indicates the selection/non-selection of the block and an address input line 55 which designates a data buffer device in the block are converted by a decode circuit 56 to chip selection input lines of the data buffer devices 40–43. The chip selection output lines from the data buffer devices 40–43 are supplied to a logic circuit 57, which outputs a logical OR of the signals on the chip selection output signal lines to the bus interface circuit 50, which connects the data bus line 51 and the data input/output line 44 in the block in accordance with the signal from the logic circuit 57. On the other hand, the flag interface circuit 52 connects the flag output line 45 to the external flag line 53 in accordance with the signal on the block selection input line 54 assuming that a portion enclosed by broken lines in FIG. 4 is an external interface circuit 56, the data buffer array device shown in FIG. 4 comprises the data buffer devices 40–43 shown in FIG. 1 and the external interface circuit 56. As seen from FIG. 4, the bus interface circuit 50 is controlled by the logical OR of the chip selection output signals of the data buffer devices 40–43 and the flag interface circuit 52 is controlled by the block selection input line. Accordingly, the data transfer to the data buffer device selected by the block selection input line 54 and the address input line 55 is held by the selected data buffer device until the end of the eighth word data, and the bus interface circuit 50 effects the input/output of the data until the end of the eighth word data by the hold signal. During such data transfer, the signals on the block selection input line 54 and the address input line 55 may be changed after the end of the first word data to designate another data buffer device in the same array or other array, and may output a signal on the flag output line 11 of the designated data buffer device.

In this manner, by the combination of the data buffer devices and the external interface circuit shown in FIG. 4, the equipment which accesses to the data buffer array device can detect the flag relating to the next transfer of the data buffer device whose data is being transferred, by holding the signal on the block selection input line 54 and the signal on the address input line 55, and the flag of the data buffer device which is to transfer the data next, by activating the block selection input line of the data buffer array device or changing the address input line 55 of the same data buffer array device.

In FIG. 4, the data buffer devices are one dimensionally arrayed. A two-dimensional data buffer array device may be constructed by adding some hardware to the data buffer devices. FIG. 5 shows a configuration of a data buffer array device which has a 4×4 two-dimensional array in the X and Y directions. Numerals 60–63 denote an X-direction data bus line (hereinafter the X-direction is simply referred to as X, and Y-direction is simply referred to as Y), an X external flag line, an X block selection input line and an X address input line, and numeral 64 denotes an X strobe signal line. Those are connected to an X external interface circuit 65. The substance of the X external interface circuit is similar to the external interface circuit 56 of FIG. 4. Similarly, a Y data bus line 66, a Y external flag line 67, a Y block selection input line 68, a Y address input line 69 and a Y strobe signal line 70 are connected to a Y external interface circuit 71. The Y external interface circuit is also similar to the external interface circuit 56 of FIG. 4. The sixteen two-dimensionally arrayed data buffer devices are identical to the data buffer devices 40–43 of FIG. 4 and a selector 13 is connected to each of those data buffer devices. A plurality of signal lines similar to those shown in FIG. 4 are connected from the X external interface circuit 65 and the Y external interface circuit 71 to the selector 73, which switches the corresponding signal lines from those two external interface circuits in order to access the data buffer device.

By the combination of the two-dimensionally arrayed data buffer devices, the selector and the external interface circuits shown in FIG. 5, the equipment which accesses to the data buffer array device can detect the flag of the data buffer device which relates to the next data transfer while it effects the input/output of the data. By the two-dimensional array of the data buffer devices as shown in FIG. 5, a two-dimensional data base array of any spread can be constructed. Such a construction is useful for a cross-bar type network and it has a wide range of applications. With this construction, the equipment which accesses to the data buffer array device can detect the flag of the data buffer device in the same data buffer array device relating to the next data transfer or the flag of the data buffer device in other data buffer array device, while it effects the input/output of the data for the designated data base device. With this function, the data transfer and the flag detection can be pipelined and high speed data transfer is attained The essence of the present invention resides in storing the chip selection signal in the data buffer device at a predetermined timing in the course of data transfer, transferring the subsequent data based on the stored signal, and controlling the output of the flag to be detected prior to the data transfer, by the chip selection signal and informing it to the external. By this arrangement, the data transfer and the detection of the flag status can be independently effected and the data can be transferred without break and with a high efficiency.

In accordance with the present invention, the chip selection input signal of the data buffer device is latched prior to the end of the input/output of N words, where N (N>2) is a minimum number of words transferred as a unit on the bus and it is held until the end of the input/output of the N-word data, and the output of the flag of the FIFO memory is controlled by the chip selection input signal present before latching so that the status of other data buffer device can be checked while the chip selection signal is held and the input/output of the data is effected. As a result, the data transfer efficiency of the bus is significantly improved.

In the data buffer array device having the array of the data buffer devices and the bus interface circuits, the input/output of the data of the bus interface circuits is controlled by the logical OR of the chip selection signals from the data buffer devices, present after latching so that a hierarchical data buffer array device is constructed without sacrificing the advantages of the present invention. This is advantageous in constructing a large scale cross-bar type network and can be equally used in networks through buffers.

We claim:

1. A data buffer device provided with a data line, a read/write control signal line, a strobe signal line, a reset signal line, a chip selection input signal line, a chip selection output signal line and a flag output line, comprising:

a first-in first-out memory having an input line and an output line;

a latch circuit for latching a chip selection input signal from said chip selection input signal line and outputting the latched signal to said chip selection output signal line as a chip selection output signal;

a control circuit initialized by a reset signal from said reset signal line, for controlling said latch circuit at an n-th pulse of every N strobe signal pulses from said strobe signal line, where N and n are predetermined integers and 1>n>N, such that said latch circuit holds said chip selection input signal, and for controlling said latch circuit at every N-th strobe signal pulse such that said latch circuit updates said chip selection output signal;

a bus interface circuit connected with said data line and said input line and said output line of said first-in first-out memory and responsive to said chip selection output signal and a read/write control signal from said read/write control signal line, for controlling data transfer between said data line and said first-in first-out memory; and an output circuit, responsive to said read/write control signal, for selecting a lag signal from a plurality of flags outputted from said first-in first-out memory and, responsive to said chip selection input signal, for outputting said flag signal to said flag output line.

2. A data buffer array apparatus having a data bus line, an external flag line, a block selection input line, an address input line and a read/write control signal line, comprising:

a plurality of data buffer devices each having a data line, a flag output line, a chip selection input line, and a chip selection output line, each of said devices for holding a chip selection input signal from said chip selection input line at an n-th access of every N data from said data line, where N and n are redetermined integers and 1>n>N, outputting said chip selection input signal to said chip selection output line as a chip selection output signal during data access from first data to (n-1)th data from said data line where n is greater than 1, outputting said chip selection input signal held in the device to said chip selection output line as a chip selection output signal during data access from n-th data to N-th data from said data line, controlling said flag output line responsive to said chip selection input signal, and controlling data transfer on said data line responsive to said chip selection output signal and a read/write control signal from said read/write control signal line;

a decode circuit connected with said chip selection input lines to respective ones of said plurality of data buffer devices, for decoding a block selection signal from said block selection input line and an address signal from said address input line, and for generating chip selection input signals to respective ones of said plurality of data buffer devices;

a flag interface circuit connected with said flag output lines from respective ones of said plurality of data buffer devices and responsive to said bock selection signal, for outputting a flag signal to said external flag line; and a bus interface circuit connected with said data lines of respective ones of said plurality of data buffer devices and responsive to a logical ORed signal of said chip selection output signals from respective ones of said plurality of data buffer devices, for controlling data transfer between said data bus line and said respective data lines.

3. A data buffer array apparatus of claim 2 wherein each of said data buffer devices further comprises:

a first-in first-out memory having an input line and an output line;

a latch circuit for latching said chip selection input signal and outputting the latched signal as said chip selection output signal;

a control circuit for controlling said latch circuit at said n-th access of every N data, such that said latch circuit holds said chip selection input signal, and for controlling said latch circuit at an N-th access of every N data such that said latch circuit updates said chip selection output signal responsive to said chip selection input signal;

a second bus interface circuit connected with said data line and said input line and said output line of said first-in first-out memory and responsive to said chip selection output signal and said read/write control signal, for controlling data transfer between said data line and said first-in first-out memory; and an output circuit, responsive to said read/write signal, for selecting a flag signal out of a plurality of flags outputted from said first-in first-out memory and, responsive to said chip selection input signal, for outputting said flag signal to said flag output line.

* * * * *